United States Patent
Misumi et al.

(10) Patent No.: US 9,986,124 B2
(45) Date of Patent: May 29, 2018

(54) COPYING APPARATUS

(71) Applicant: FUJI XEROX CO., LTD., Tokyo (JP)

(72) Inventors: Akira Misumi, Kanagawa (JP); Takayuki Hashimoto, Kanagawa (JP); Yuichi Sugiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 16 days.

(21) Appl. No.: 15/016,377

(22) Filed: Feb. 5, 2016

(65) Prior Publication Data
US 2017/0026542 A1  Jan. 26, 2017

(30) Foreign Application Priority Data

Jul. 22, 2015  (JP) ................. 2015-145076

(51) Int. Cl.
*H04N 1/32* (2006.01)

(52) U.S. Cl.
CPC . *H04N 1/32358* (2013.01); *H04N 2201/0091* (2013.01); *H04N 2201/0094* (2013.01)

(58) Field of Classification Search
CPC .. H04N 1/00933; H04N 1/0473; H04N 1/053; H04N 2201/04786; H04N 2201/33385
USPC ..... 358/1.9, 3.24, 1.12, 1.15, 504, 409, 449; 382/282, 303, 286; 702/89
See application file for complete search history.

(56) References Cited

U.S. PATENT DOCUMENTS

| 7,457,010 | B2 * | 11/2008 | Tehrani | H04N 1/00681 358/444 |
| 2002/0091724 | A1 | 7/2002 | Yokoe | |
| 2008/0165371 | A1 * | 7/2008 | Tanaka | H04N 1/32502 358/1.3 |
| 2009/0092416 | A1 * | 4/2009 | Tao | G03G 21/14 399/154 |

FOREIGN PATENT DOCUMENTS

JP  2002-205443 A  7/2002

* cited by examiner

*Primary Examiner* — Jamares Q Washington
(74) *Attorney, Agent, or Firm* — Sughrue Mion, PLLC (57) ABSTRACT

A copying apparatus includes a capturing unit that divides an image on a document into plural regions and captures an image of each region, a storage unit that stores data representing the image of the region, a forming unit that reads the data and forms an image represented by the data on a medium, and an instruction unit that determines a capture start time on the basis of a size of the data and instructs the capturing unit to start capturing the image at the capture start time.

9 Claims, 11 Drawing Sheets

COPYING APPARATUS

CROSS-REFERENCE TO RELATED APPLICATIONS

This application is based on and claims priority under 35 USC 119 from Japanese Patent Application No. 2015-145076 filed Jul. 22, 2015.

BACKGROUND

Technical Field

The present invention relates to a copying apparatus.

SUMMARY

According to an aspect of the present invention, a copying apparatus includes a capturing unit that divides an image on a document into plural regions and captures an image of each region, a storage unit that stores data representing the image of the region, a forming unit that reads the data and forms an image represented by the data on a medium, and an instruction unit that determines a capture start time on the basis of a size of the data and instructs the capturing unit to start capturing the image at the capture start time.

BRIEF DESCRIPTION OF THE DRAWINGS

Exemplary embodiments of the present invention will be described in detail based on the following figures, wherein.

DETAILED DESCRIPTION

1. Exemplary Embodiment

Figure 1:
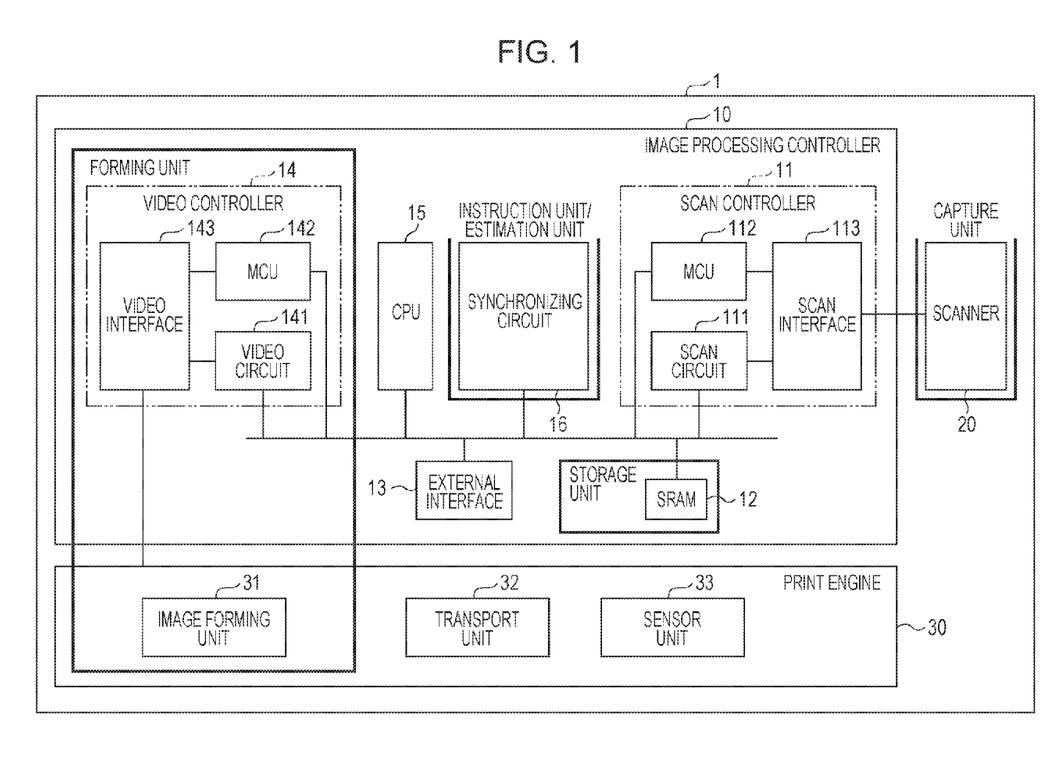
FIG. 1 illustrates the hardware structure of a copying apparatus according to an exemplary embodiment.

FIG. 1 illustrates the hardware structure of a copying apparatus 1 according to an exemplary embodiment. The copying apparatus 1 is an image processing apparatus that captures an image on a document and forms the captured image on a medium, such as a paper sheet.

Figure 2:
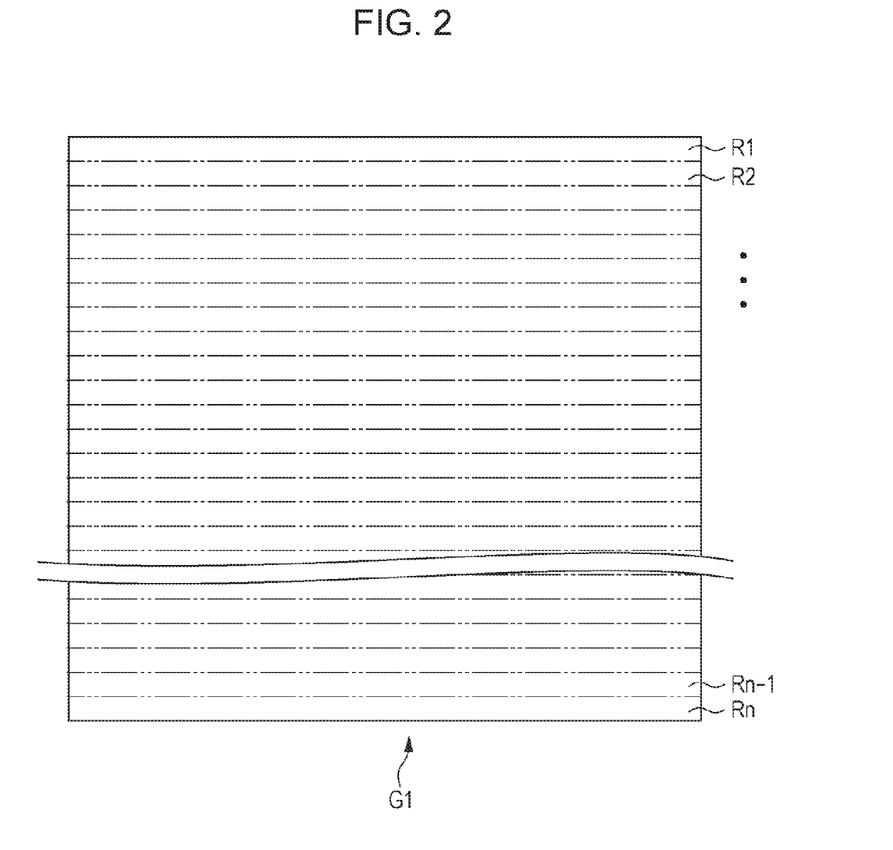
FIG. 2 illustrates an example of regions into which an image on a document is divided.

The copying apparatus 1 includes an image processing controller 10, a scanner 20, and a print engine 30. The scanner 20, which is an example of a "capturing unit" in the present invention, captures an image on a document. For example, the scanner 20 irradiates an image on a document with light and captures the image by using diffusely reflected light from the image. To be specific, the scanner 20 divides the image on the document into plural regions and sequentially scans images of the regions. Referring to FIG. 2, the regions will be described.

FIG. 2 illustrates an example of regions into which an image G1 on a document is divided. In the example illustrated in FIG. 2, the image G1 is divided into n regions R, which are R1, R2, . . . , Rn−1, Rn (where n is a natural number). Each of the regions R has a rectangular shape that is elongated in the scanning direction of the scanner 20. An image on one region R is called a one-line image. The scanner 20 captures the image G1 by, for example, first capturing an image on the region R1, then capturing an image on the region R2, and sequentially capturing images on the regions R until the scanner 20 captures an image on the region Rn. In the present exemplary embodiment, it is assumed that the image G1 is formed on an A4-sized document, and the scanner 20 captures the image G1 with a specific resolution (for example, 600 dots per inch (dpi)).

The print engine 30 forms an image on a medium, such as a paper sheet, by using an electrophotographic method. For example, the print engine 30 uses four color toners of yellow (Y), magenta (M), cyan (C), and black (K). The print engine 30 includes an image forming unit 31, a transport unit 32, and a sensor unit 33. The image forming unit 31 includes a photoconductor drum, a charger, an exposure device, a developing device, an intermediate transfer belt, a first transfer roller, a second transfer roller, a backup roller, and a fixing unit. The image forming unit 31 forms an image on a medium by transferring (second-transferring) and fixing a toner image to a medium. The transport unit 32 includes plural transport rollers and transports a medium to a position where the image forming unit 31 transfers an image to the medium.

Figure 3:
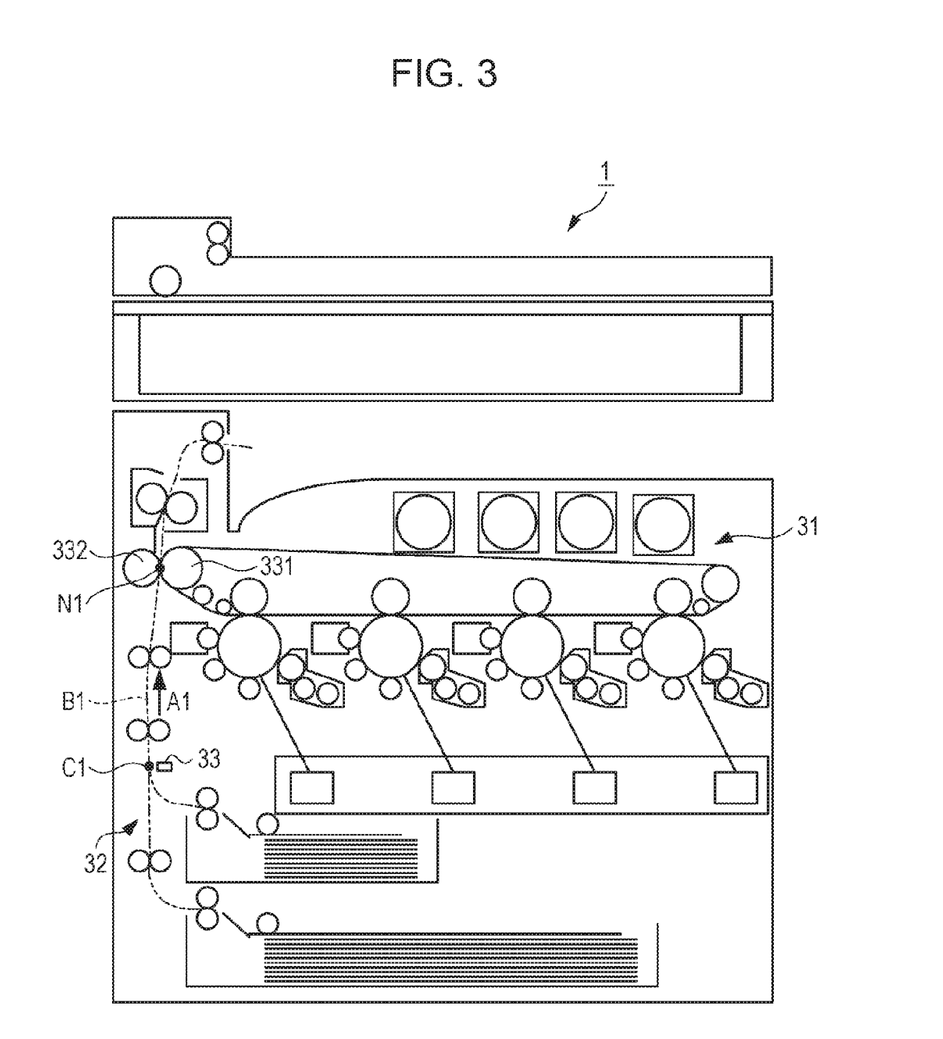
FIG. 3 illustrates a cross section of the copying apparatus.

The sensor unit 33 is disposed adjacent to a transport path, along which the transport unit 32 transports a medium, and detects a medium transported by the transport unit 32. Referring to FIG. 3, the location of the sensor unit 33 will be described.

FIG. 3 illustrates a cross section of the copying apparatus 1. The transport unit 32 transports a medium along a transport path B1 in a transport direction A1. The transport path B1 extends through a nip N1 between a second transfer roller 331 and a backup roller 332 of the image forming unit 31. The sensor unit 33 faces a detection position C1 in the transport path B1, which is upstream of the nip N1 in the transport direction A1. The detection position C1 is a position where the sensor unit 33 detects a leading end of the medium. In other words, the sensor unit 33 detects that the leading end of the medium has reached the detection position C1.

The image processing controller 10 controls the scanner 20 and the print engine 30, processes data representing an image captured from a document, and forms the image on a medium. The image processing controller 10 includes a scan controller 11, a static random access memory 12 (SRAM), an external interface 13, a video controller 14, a central processing unit 15 (CPU), and a synchronizing circuit 16.

The scan controller 11 controls the scanner 20. The scan controller 11 includes a scan circuit 111, a microcontroller unit 112 (MCU), and a scan interface 113. The scan circuit 111 is configured to control the scanner 20. The MCU 112 executes a program for controlling the scanner 20. The scan interface 113 relays data that is exchanged among the scanner 20, the scan circuit 111, and the MCU 112.

For example, the scan circuit 111 sends a command to start capturing an image to the scanner 20 through the scan interface 113. Upon receiving the command, the scanner 20 first captures an image of, for example, the region R1 illustrated in FIG. 2. The scanner 20 sequentially captures images of the regions R, generates signals representing the images, and sends the signals to the scan circuit 111 through the scan interface 113. The scan circuit 111 generates regional image data that represents the images of the regions R represented by the signals. The scan circuit 111 stores the regional image data in the SRAM 12.

The SRAM 12 stores data (regional image data) representing the images of the regions R captured by the scanner 20. The SRAM 12 is an example of a "storage unit" in the present invention. For example, the SRAM 12 has a capacity for storing image data for three regions when the scanner 20 captures the image G1 having the A4-size illustrated in FIG. 2 with a resolution of 600 dpi as described above. The external interface 13 relays data that is exchanged between the copying apparatus 1 and external apparatuses, such as a smartphone.

The video controller 14 controls the print engine 30. The video controller 14 includes a video circuit 141, an MCU 142, and a video interface 143. The video circuit 141 is configured to control the print engine 30. The MCU 142 executes a program for controlling the print engine 30. The video interface 143 relays data that is exchanged among the print engine 30, the video circuit 141, and the MCU 142.

The video controller 14 reads regional image data stored in the SRAM 12 and converts the regional image data into a format that the image forming unit 31 is capable of processing. The video controller 14 sends the converted regional image data to the image forming unit 31 and instructs the image forming unit 31 to form an image represented by the data. Upon receiving this instruction, the image forming unit 31 forms an image represented by the regional image data on a medium that passes through the nip N1 illustrated in FIG. 3. Thus, the video controller 14 and the image forming unit 31, which are an example of a "forming unit" in the present invention, read regional image data stored in the SRAM 12 and form an image represented by the data on a medium.

Figure 4:
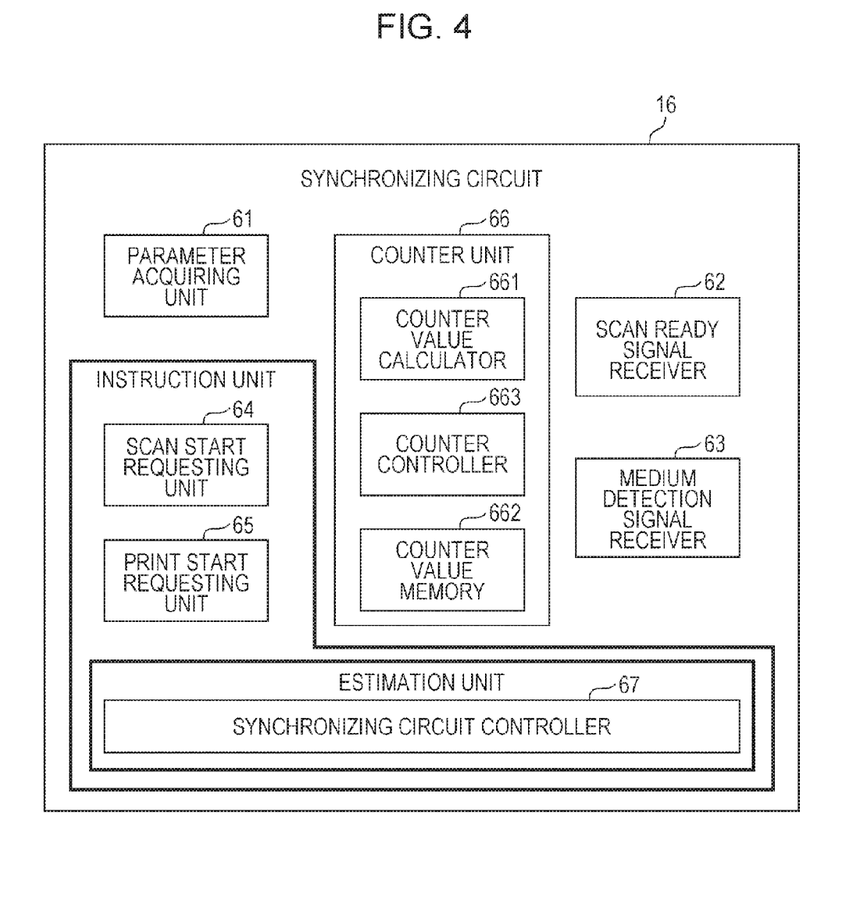
FIG. 4 illustrates the functional structure of a synchronizing circuit.

The CPU 15 is a computer that executes a program, which is stored in a ROM/RAM (not shown), and controls the operations of components of the copying apparatus 1. The synchronizing circuit 16 synchronizes a capture timing at which the scanner 20 captures an image with an image forming timing at which the print engine 30 forms an image. Referring to FIG. 4, the details of the function of the synchronizing circuit 16 will be described below.

FIG. 4 illustrates the functional structure of the synchronizing circuit 16. The synchronizing circuit 16 includes a parameter acquiring unit 61, a scan ready signal receiver 62, a medium detection signal receiver 63, a scan start requesting unit 64, a print start requesting unit 65, a counter unit 66, and a synchronizing circuit controller 67. The parameter acquiring unit 61 acquires parameters that are used to synchronize the image capture timing with the image forming timing. In the present exemplary embodiment, the parameter acquiring unit 61 acquires the document size and the capturing resolution as parameters.

The size of a document that is set at a capturing position may be detected by the scanner 20, and the parameter acquiring unit 61 may acquire the detected size as a parameter. Alternatively, a user may input or select the size of a document, and the parameter acquiring unit 61 may acquire the input/selected size as a parameter. The parameter acquiring unit 61 may acquire the capturing resolution set in the scanner 20 as a parameter. Alternatively, a user may select the capturing resolution, and the parameter acquiring unit 61 may acquire the selected capturing resolution as a parameter.

The scanner 20 is in a stand-by mode when it is not scanning an image. When instructed by the CPU 15, the scanner 20 prepares for starting scanning. After having been prepared, the scanner 20 sends a scan ready signal to the synchronizing circuit 16 via the scan controller 11. The scan ready signal receiver 62 receives the scan ready signal from the scanner 20.

When the sensor unit 33 illustrated in FIG. 3 detects a leading end of a medium, the sensor unit 33 sends a medium detection signal to the synchronizing circuit 16 via the video controller 14. The medium detection signal receiver 63 receives the medium detection signal from the sensor unit 33.

The scan start requesting unit 64 requests the scanner 20 to start capturing an image. When requested by the scan start requesting unit 64, for example, the scanner 20 starts capturing the image G1 on the document illustrated in FIG. 2 sequentially from an image on the region R1. The print start requesting unit 65 requests the print engine 30 to start forming an image. When requested by the print start requesting unit 65, the image forming unit 31 of the print engine 30 starts reading regional image data stored in the SRAM 12.

The counter unit 66 controls a counter value that changes toward a capture start time at which the scanner 20 starts capturing an image and an image forming time at which the image forming unit 31 of the print engine 30 starts forming an image. The counter unit 66 includes a counter value calculator 661, a counter value memory 662, and a counter controller 663. The counter value calculator 661 calculates a counter value at a predetermined interval (such as 1 millisecond). The counter value memory 662 stores the counter value calculated by the counter value calculator 661. The counter controller 663 supplies an initial value of the counter value to the counter value calculator 661 and instructs the counter value calculator 661 to start calculation. When the counter value stored in the counter value memory 662 becomes a predetermined value, the counter controller 663 sends a signal to the synchronizing circuit controller 67.

The synchronizing circuit controller 67 determines the capture start time and the image forming time on the basis of the parameters received by the parameter acquiring unit 61, the timing at which the medium detection signal receiver 63 received the medium detection signal, and the counter value changed by the counter unit 66. The synchronizing circuit controller 67 estimates a reaching time at which a leading end of a medium reaches the nip N1 illustrated in FIG. 3, that is, an image forming position where the image forming unit 31 forms an image on the medium. The synchronizing circuit controller 67 is an example of an "estimation unit" in the present invention.

The synchronizing circuit controller 67 estimates the reaching time on the basis of a receive time t1 when the medium detection signal receiver 63 receives the medium detection signal, a transport speed D1 with which the transport unit 32 transports the medium, and a transport distance L1 from the detection position C1 to the nip N1 illustrated in FIG. 3 along the transport path B1. To be specific, the synchronizing circuit controller 67 calculates t2=receive time t1+transport distance L1÷transport speed D, and estimates t2 to be the reaching time.

The synchronizing circuit controller 67 calculates a capture time required by the scanner 20 to capture images of regions, a write time required to write regional image data in the SRAM 12, a read time required to read the regional image data, and a process time required by the video controller 14 and the image forming unit 31 to process the regional image data to start forming an image represented by the regional image data on a medium. Here, the meaning of the term "process" is to perform pre-transfer processing on an image before transferring the image to a medium. The pre-transfer processing includes the aforementioned data conversion (of converting regional image data into a format that the image forming unit 31 is capable of processing), exposure, development, and the like.

In the present exemplary embodiment, the scanner 20 captures images of M regions (where M is a natural number, such as 3). Hereinafter, a group of M regions will be referred to as a "band". For example, the scanner 20 sequentially captures images of a band 1 to a band N (where N is a natural number). The aforementioned capture time is the time required to capture images of one band of regions (that is, M regions). The write time and the read time are respectively the time required to write and read image data for one band of regions (that is, M regions). The process time is the time required to perform the pre-transfer processing on the regional image data for one band of regions to start forming an image represented by the regional image data.

In the present exemplary embodiment, a write operation of writing the image data for one band of regions is performed after a capture operation of capturing the images of one band has been finished, a read operation of reading the regional image data is performed after the write operation has been finished, and the pre-transfer processing is performed after the read operation has been finished. The intervals between these operations are negligibly small.

The larger the size of the regional image data, the longer the capture time, the write time, the read time, and the process time. The synchronizing circuit 16 stores mathematical formulas representing the relationships between the size of the regional image data and these times. The synchronizing circuit controller 67 calculates the size of the regional image data on the basis of the document size and the capturing resolution, which are parameters obtained by the parameter acquiring unit 61. On the basis of the calculated size of the regional image data (to be specific, by assigning the calculated size to the aforementioned mathematical formulas), the synchronizing circuit controller 67 calculates the capture time, the write time, the read time, and the process time.

Figure 5:
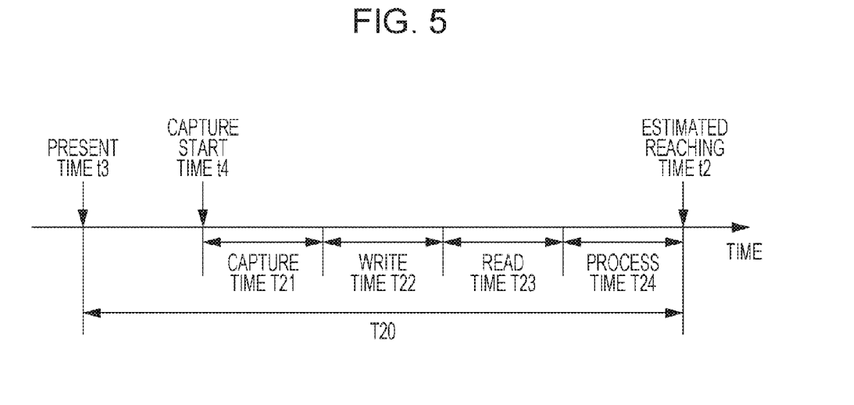
FIG. 5 illustrates an example of a capture start time.

The synchronizing circuit controller 67 determines a capture start time by using these times and instructs the scanner 20 to start capturing an image at the capture start time. The synchronizing circuit controller 67 is an example of an "instruction unit" in the present invention. Referring to FIG. 5, a method of determining the capture start time will be described.

FIG. 5 illustrates an example of the capture start time. In FIG. 5, the horizontal axis represents the time. As illustrated in FIG. 5, the synchronizing circuit controller 67 instructs the scanner 20 to start capturing the image at a time t4 (the capture start time in this case), which is earlier than the reaching time t2 by the sum of the capture time T21, the write time T22, the read time T23, and the process time T24, which are estimated as described above. In the present exemplary embodiment, the synchronizing circuit controller 67 gives the instruction to the scanner 20 via the scan controller 11. However, the synchronizing circuit controller 67 may give the instruction directly to the scanner 20.

To be specific, the synchronizing circuit controller 67 calculates a time (T20−(T21+T22+T23+T24)), which is the difference between a time T20 (from the present time t3 to the reaching time t2) and the sum of the capture time T21, the write time T22, the read time T23, and the process time T24. Then, the synchronizing circuit controller 67 causes the counter unit 66 to set the time (T20−(T21+T22+T23+T24)) as a scan counter value and to start calculating a counter value. The counter unit 66 sends a signal to the synchronizing circuit controller 67 when the counter value stored in the counter value memory 662 becomes the scan counter value. Upon receiving the signal, the synchronizing circuit controller 67 determines that the present time is the time t4 and instructs the scanner 20 to start capturing the image via the scan controller 11. The scanner 20 starts capturing the image at the time t4 as instructed.

Figure 6:
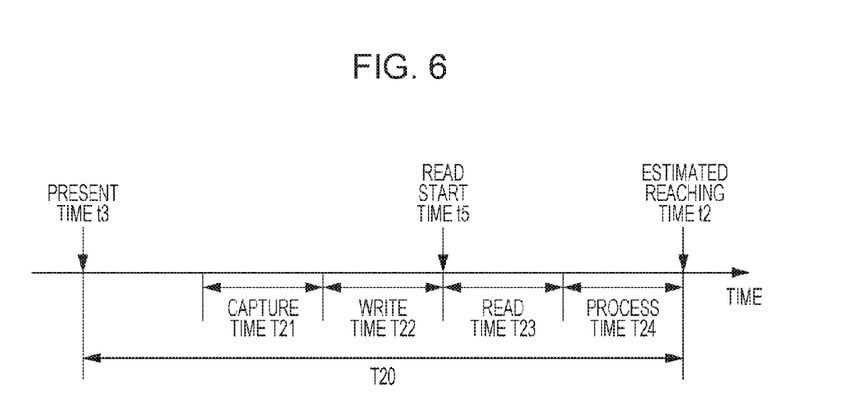
FIG. 6 illustrates an example of a read start time.

By using these calculated times, the synchronizing circuit controller 67 determines a read start time and instructs the video controller 14 to start reading the regional image data from the SRAM 12 at the read start time. Referring to FIG. 6, a method of determining the read start time will be described.

FIG. 6 illustrates an example of the read start time. In FIG. 6, the horizontal axis represents the time. As illustrated in FIG. 6, the synchronizing circuit controller 67 instructs the video controller 14 to start reading the regional image data from the SRAM 12 at a time t5 (the read start time in this case), which is earlier than the reaching time t2 by the sum of the read time T23 and the process time T24, which are estimated as described above.

To be specific, the synchronizing circuit controller 67 calculates a time (T20−(T23+T24)), which is the difference between the time T20 (from the present time t3 to the reaching time t2) and the sum of the read time T23 and the process time T24. Then, the synchronizing circuit controller 67 causes the counter unit 66 to set the time (T20−(T23+T24)) as a print counter value and to start calculating a counter value. The counter unit 66 sends a signal to the synchronizing circuit controller 67 when the counter value stored in the counter value memory 662 becomes the print counter value. Upon receiving the signal, the synchronizing circuit controller 67 determines that the present time is the time t5 and instructs the video controller 14 to start reading the regional image data. The video controller 14 starts reading the regional image data at the time t5 as instructed.

Because the scanner 20 starts capturing an image at the time t4, regional image data of the region R1, which is captured first, has been written in the SRAM 12 at the time t5. The video controller 14 starts reading the regional image data stored in the SRAM 12 at the time t5, which is the read start time, as instructed. Thus, when the video controller 14 has read the regional image data and the video controller 14 and the image forming unit 31 have finished the pre-transfer processing to start forming an image on a medium, the medium reaches the image forming position (the nip N1) and the image forming unit 31 forms the image of the region R1 on the medium.

Figure 7:
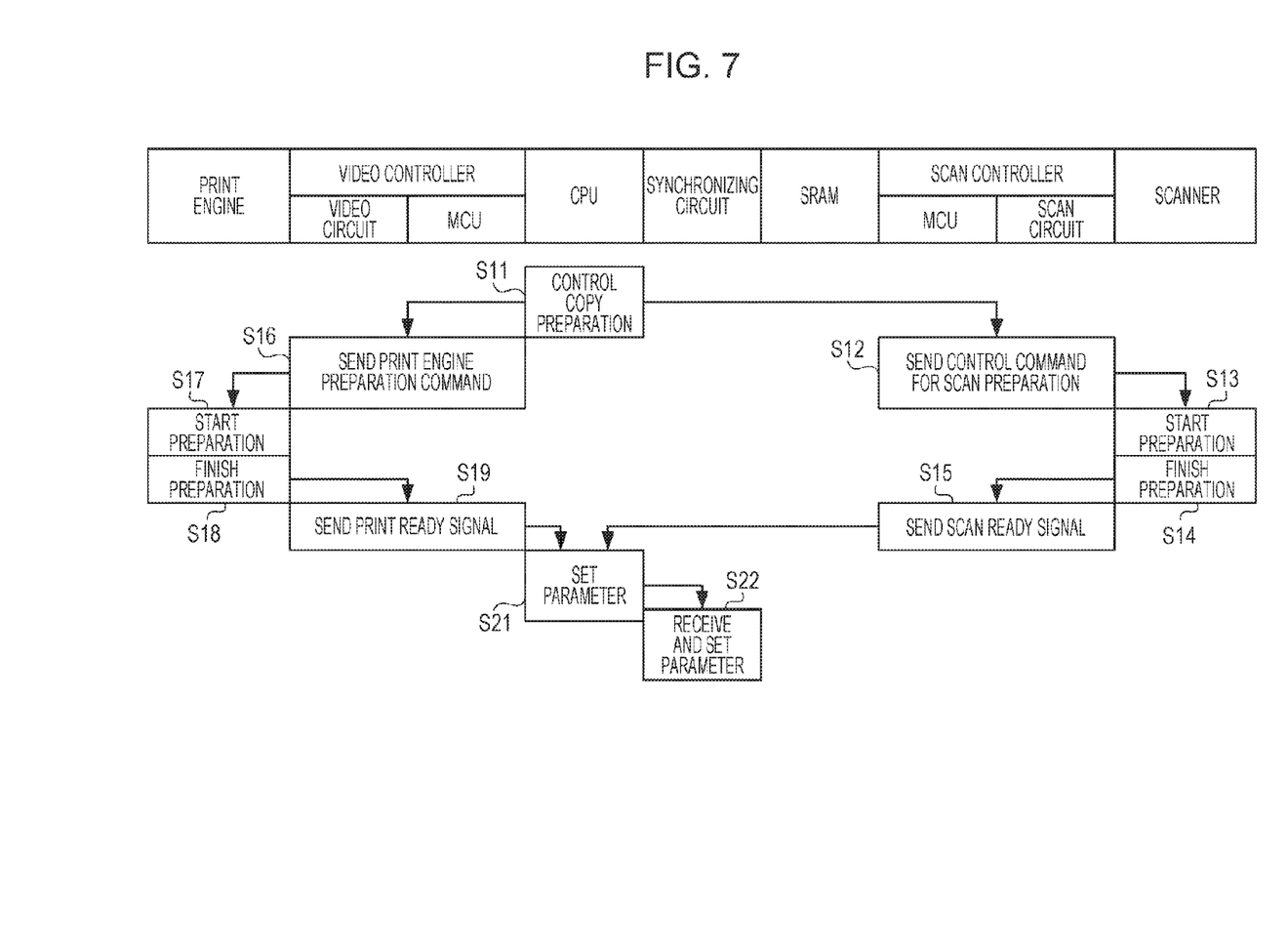
FIG. 7 illustrates an example of a process of operations performed by components of the copying apparatus.
Figure 9:
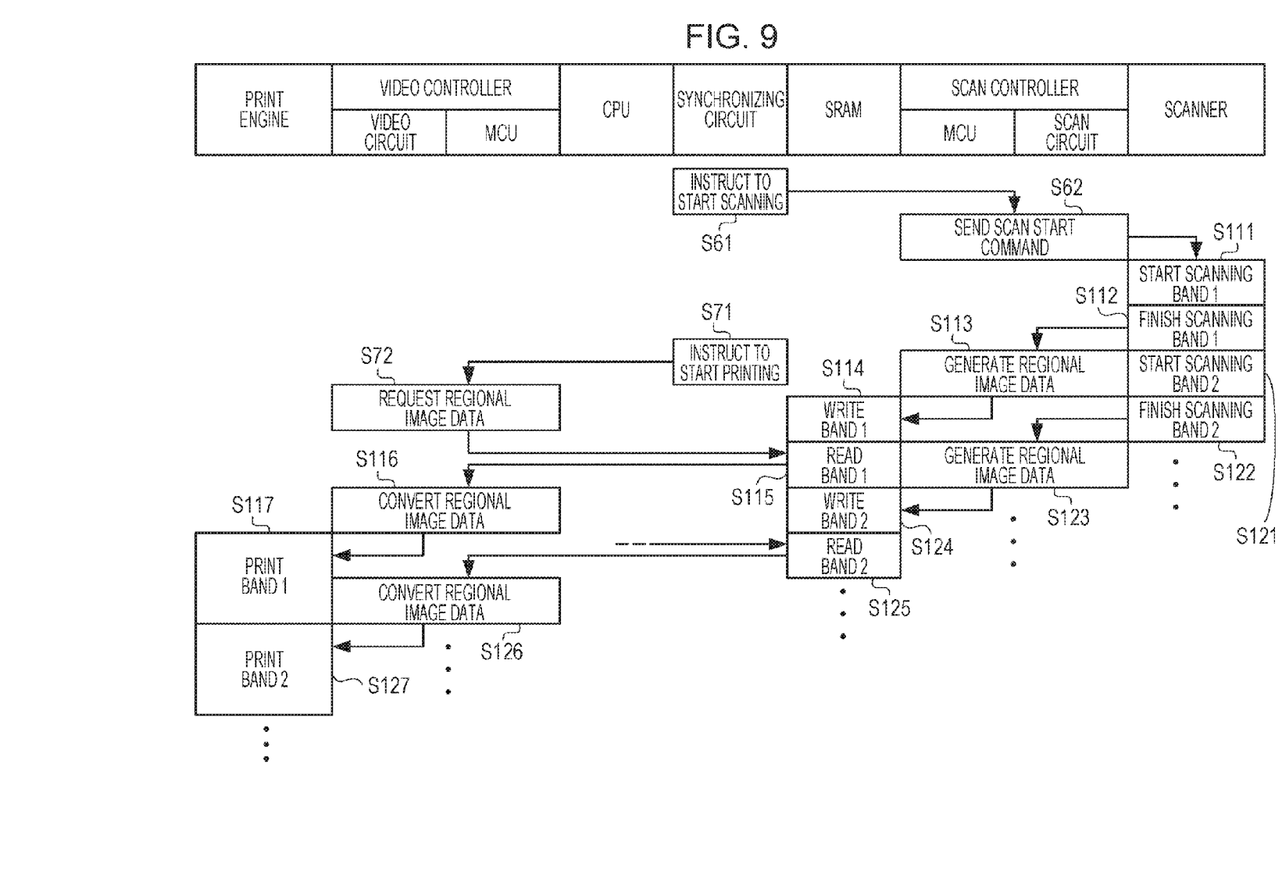
FIG. 9 illustrates an example of a continuation of the process illustrated is FIG. 8.

Referring to FIGS. 7 and 9, a process related to the capture start time and the read start time will be described.

FIG. 7 illustrates an example of a process performed by the components of the copying apparatus 1. The process is started when a user sets a document on the copying apparatus 1 and starts copying the document. First, the CPU 15 performs control to cause the scan controller 11 and the video controller 14 to prepare copying (step S11). On the basis of the control, the scan controller 11 sends a scan preparation command to the scanner 20 (step S12).

Upon receiving the command from the scan controller 11, the scanner 20 starts preparation for a scanning operation (step S13). When the preparation is finished, the scanner 20 sends a signal to the scan controller 11 (step S14). During the preparation, the scanner 20 detects the size of the document and sends a signal indicating the size to the scan controller 11 (step S14). The scan controller 11 sends a scan ready signal, indicating that the preparation of the scanner 20 has been finished and the size of the document, to the CPU 15 (step S15).

On the basis of the control by the CPU 15, the video controller 14 sends a print preparation command to the print engine 30 (step S16). Upon receiving the command from the video controller 14, the print engine 30 starts preparation for a print operation (step S17). When the preparation is finished, the print engine 30 sends a signal to the video controller 14 (step S18). The video controller 14 sends a print ready signal, indicating that the preparation of the print engine 30 has been finished, to the CPU 15 (step S19).

The CPU 15 sets the size of the document, which is indicated by the scan ready signal received in step S15, as a parameter, and supplies the parameter to the synchronizing circuit 16 (step S21). The synchronizing circuit 16 sets the parameter, received from the CPU 15, as a parameter that is used for instruction to the scanner 20 via the scan controller 11 and for instruction to the print engine 30 via the video controller 14 (step S22).

Figure 8:
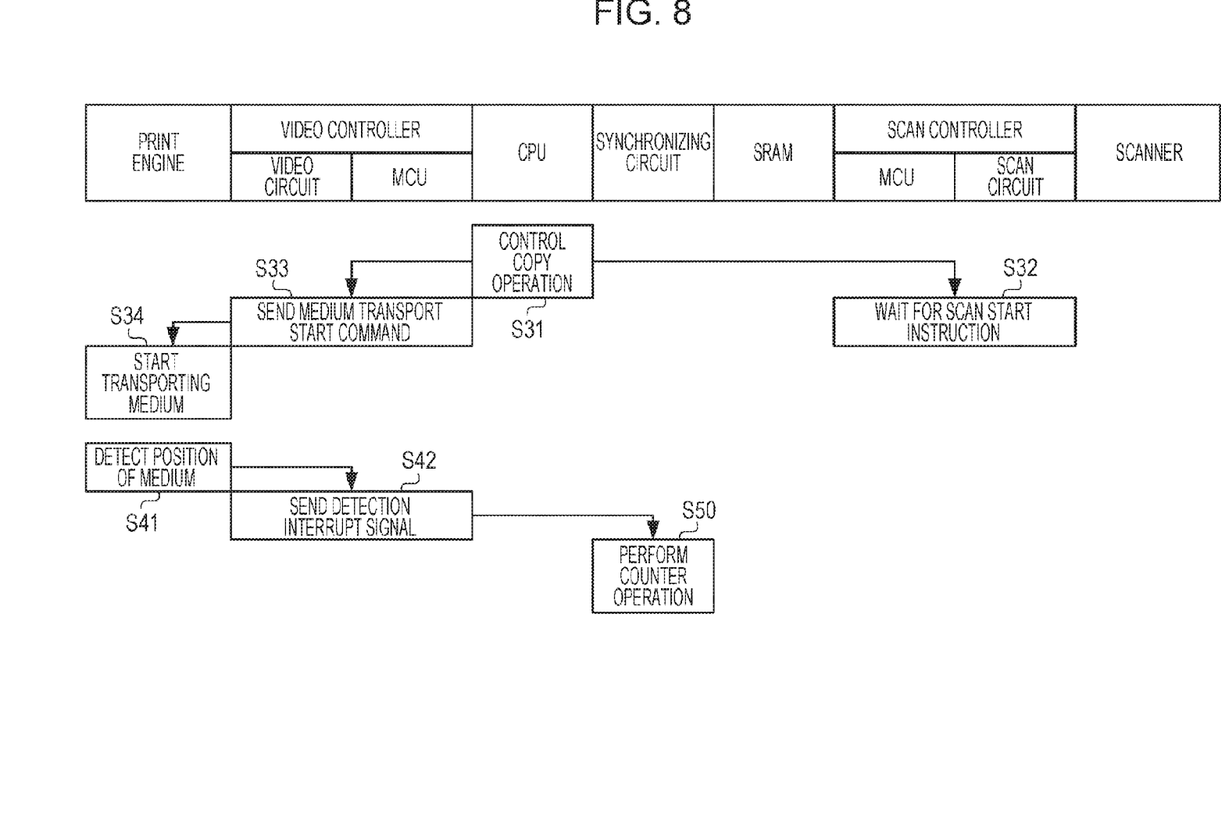
FIG. 8 illustrates an example of a continuation of the process illustrated is FIG. 7.

FIG. 8 illustrates an example of a continuation of the process illustrated is FIG. 7. After receiving the scan ready signal and the print ready signal and setting the parameter, the CPU 15 starts controlling a copy operation (step S31). The CPU 15 instructs the scan controller 11 to wait for a scan start instruction (step S32). The CPU 15 instructs the video controller 14 to start transporting a medium (step S33). Upon receiving the instruction, the video controller 14 sends a medium transport command to the print engine 30 (step S33).

Upon receiving the command, the print engine 30 starts transporting the medium (step S34). After started transporting the medium, the print engine 30 (the sensor unit 33) detects the position of the medium and sends a signal indicating the position to the video controller 14 (step S41). The video controller 14 sends a detection interrupt signal, indicating that the position of the medium has been detected, to the synchronizing circuit 16 (step S42). Upon receiving the detection interrupt signal, for example, as described above with reference to FIGS. 5 and 6, the synchronizing circuit 16 performs a counter operation of setting the scan counter value (T20−(T21+T22+T23+T24)) and the print counter value (T20−(T23+T24)) and calculating a counter value (step S50).

FIG. 9 illustrates an example of a continuation of the process illustrated is FIG. 8. When the counter value becomes the scan counter value (T20−(T21+T22+T23+T24)), which has been set in step S50, the synchronizing circuit 16 determines that the present time is the time t4 illustrated in FIG. 5 and instructs the scan controller 11 to start scanning (step S61). Upon receiving the instruction, the scan controller 11 sends a scan start command to the scanner 20 (step S62).

Upon receiving the command in step S62, the scanner 20 starts capturing (scanning) images of the band 1 regions (step S111). The scanner 20 successively sends signals representing the captured images to the scan controller 11. When finished scanning the band 1, the scanner 20 sends a scan finish interrupt signal to the scan controller 11 (step S112). Upon receiving the signal, the scan controller 11 generates regional image data represented by the signal (step S113) and writes the regional image data in the SRAM 12 (step S114).

Subsequently, the scanner 20 starts capturing (scanning) images of the band 2 regions (step S121), the scanner 20 sends a scan finish interrupt signal to the scan controller 11 (step S122), the scan controller 11 generates the regional image data (step S123), and the scan controller 11 writes the regional image data in the SRAM 12 (step S124). Subsequently, the same operation is repeatedly performed on the band 3 and the other bands.

When the counter value becomes the scan counter value (T20−(T23+T24)), which has been set in step S50, the synchronizing circuit 16 determines that the present time is the time t5 illustrated in FIG. 6 and instructs the video controller 14 to start printing (step S71). Upon receiving the instruction, the video controller 14 requests the SRAM 12 for regional image data for one band of regions (step S72). Because the regional image data for the band 1 of regions has been written in the SRAM 12 in step S114 by this time, the SRAM 12 supplies the regional image data for the band 1 regions, which is the requested regional image data for one band of regions, to the video controller 14 (step S115).

The video controller 14 converts the regional image data for the band 1 into print data and supplies the print data to the print engine 30 (step S116). Because the leading end of the medium has reached the nip N1 by this time, the print engine 30 forms an image of the band 1 regions on the basis of the supplied print data (step S117). Subsequently, the video controller 14 requests the SRAM 12 for regional image data, and the SRAM 12 supplies the regional image data for the band 2 to the video controller 14 (step S125). The video controller 14 converts the regional image data for the band 2 into print data (step S126), and the print engine 30 forms an image of the band 2 regions on the medium (step S127). Subsequently, the same operation is repeatedly performed on the band 3 and the other bands.

In the present exemplary embodiment, when copying an image, the SRAM 12 stores regional image data, which represents images of regions into which an image on one page (such as the image G1 illustrated in FIG. 2) is divided. At one time, the SRAM 12 stores regional image data for at most one band. Thus, with the present exemplary embodiment, it is possible to copy an image by using a storage area that is smaller than the size of image data for one page (in the present exemplary embodiment, the SRAM 12, which has a capacity for storing regional image data for only three regions).

In the present exemplary embodiment, the synchronizing circuit controller 67 determines the read start time and instructs the video controller 14 to start reading regional image data from the SRAM 12 at the read start time. Thus, even if a time required from reading the regional image data from the SRAM 12 to forming an image varies in accordance with the size of the regional image data, it is possible to form the image by using the SRAM 12 as described above. In the present exemplary embodiment, the instructions are issued by using the capture time, the write time, the read time, and the process time. Therefore, even if these times vary in accordance with the size of the regional image data, it is possible to form the image by using the SRAM 12.

In the present exemplary embodiment, the reaching time, at which the medium reaches the image forming position, is estimated, and forming of an image on a medium is started in accordance with the estimated time. Thus, even if the timing at which the medium reaches the image forming position is not fixed, it is possible to form an image by using the SRAM 12 as described above.

2. Modifications

The exemplary embodiment described above is only an example for carrying out the present invention, and the exemplary embodiment may be modified as follows. The exemplary embodiment and the modifications may be used in combination as necessary.

2-1. Instructions on Capturing Time for Regions

Figure 10A:
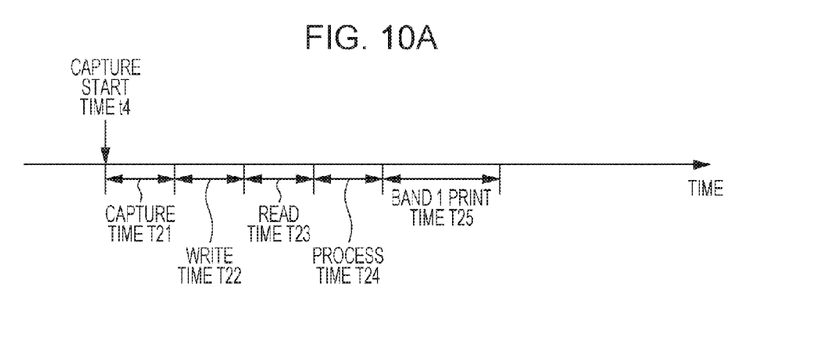
FIGS. 10A to 10C illustrate a method of determining a capture start time according to a modification.
Figure 10B:
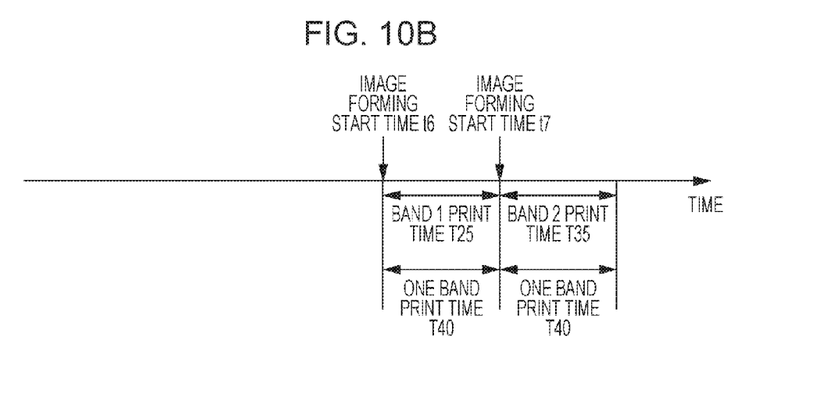
Figure 10C:
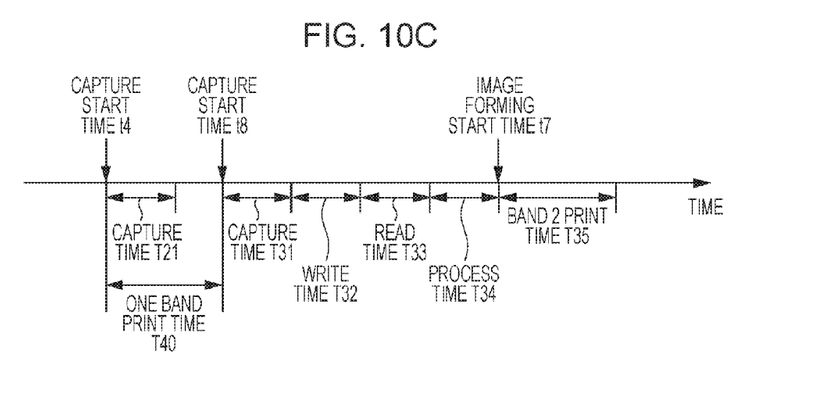

In the exemplary embodiment, the synchronizing circuit controller 67 determines a capture start time and instructs the scanner 20 to start capturing an image of the band 1 at the capture start time. In addition, the synchronizing circuit controller 67 may also determine capture start times at which the scanner 20 starts capturing images of the band 2 and other bands. Referring to FIGS. 10A to 10C, a method of determining these times will be described.

FIGS. 10A to 10C illustrate the method of determining the capture start times according to the present modification. Referring to FIG. 10A, an instruction is issued at the time t4, which is described above with reference to FIG. 5, to start capturing an image of the band 1 regions. After the capture time T21, the write time T22, the read time T23, and the process time T24 have elapsed, an image of the band 1 regions is formed in a print time T25. In the present modification, the print time T25 is longer than the capture time T21 (T25>T21).

After forming the image of the band 1 on a medium, it is necessary to form an image of the band 2 regions on the medium. Referring to FIG. 10B, immediately after the print time T25 required to form the image of the band 1 regions has elapsed, a print time T35 required to form the image of the band 2 regions starts. In this case, the image of the band 1 regions and the image of the band 2 regions are respectively started to be formed at a start time t6 and a start time t7.

FIG. 10C illustrates a capture start time t8 at which capturing of an image of the band 2 regions is started in the case where forming of the image is to be started at the start time t7. The capture start time t8 is earlier than the start time t7, at which forming of the image of the band 2 region is to be started, by the sum of the capture time T31, the write time T32, the read time T33, and the process time T34. The capture start time t8 is later than the capture start time t4, at which capturing of the image of the band 1 regions is started, by a print time T40 (T40>capture time T21, T31), which is a time required to form an image of one band of regions.

In the present modification, the synchronizing circuit 16 stores a mathematical formula (or a table) representing a relationship between the print time T40 and the size of the regional image data. The synchronizing circuit controller 67 calculates the print time T40 on the basis of the size of the regional image data. The synchronizing circuit controller 67 instructs the scanner 20 to start capturing an image of the next region at a time (in the example illustrated in FIG. 10C, at the time t8) that is later than the time (in the example illustrated in FIG. 10C, the time t4) at which the synchronizing circuit controller 67 instructs the scanner 20 to start capturing an image by the print time T40 (that is, a time required by the video controller 14 and the image forming unit 31 to form an image of one band of regions after finishing the pre-transfer processing).

With the present modification, because the capture times T21 and T31 and the like are shorter than the print time T40, an instruction for starting capturing of the image of the band 2 regions is not issued before capturing of the image of the band 1 regions is finished. If capturing of the band 2 were started immediately after capturing of the band 1 and capturing, writing, reading, and pre-transfer processing for the band 2 were successively preformed, the image of the band 2 regions would be started to be formed before forming of the image of the band 1 would be finished. Therefore, for example, it would be necessary to wait for reading, and hence the size of regional image data to be stored in the SRAM 12 would exceed the size for one band of regions. With the present modification, in the case where the image capturing speed for capturing an image of each region is higher than the image forming speed for forming an image of the region, as compared with a case where instructions on the image start capture times for capturing images of the band 2 regions and other regions are not issued, it is possible to reduce the storage capacity of the SRAM 12.

2-2. Instruction on Transport Time

In the exemplary embodiment, an instruction is issued so that transport of the medium is first started, and capturing of an image is started at a timing at which the medium reaches the image forming position. Alternatively, instruction may be issued so that capturing of an image is first started and transport of the medium may be started at a timing at which forming of an image is started.

Instruction in the present modification is issued in case where a transport time from the time at which the transport unit 32 starts transporting the medium to the time at which the medium reaches the image forming position is shorter than the sum of the capture time T21, the write time T22, the read time T23, and the process time T24, which are described above.

Figure 11:
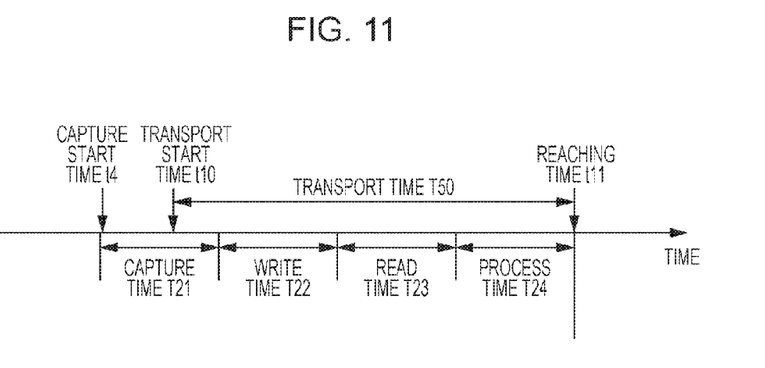
FIG. 11 illustrates an example of a transport start time according to a modification.

FIG. 11 illustrates an example of a transport start time according to the present modification. In the example illustrated in FIG. 11, a reaching time t11, which is the time at which a medium reaches the image forming position, is later than the capture start time t4 by the sum of the capture time T21, the write time T22, the read time T23, and the process time T24. The synchronizing circuit controller 67 instructs the transport unit 32 to start transporting the medium at a time t10, which is earlier than the reaching time t11 by a transport time T50 (a time required by the medium to reach the image forming position after started to be transported by the transport unit 32).

In the present modification, the synchronizing circuit controller 67 determines a transport start time on the basis of the capture time T21, the write time T22, the read time T23, the process time T24, and the transport time T50; and the synchronizing circuit controller 67 instructs the transport unit 32 to start transporting the medium at the transport start time. Thus, even if the transport time is short as described above, it is possible to copy an image by using the SRAM 12.

2-3. Start Time

In the example illustrated in FIG. 5, the synchronizing circuit controller 67 instructs the scanner 20 to start capturing the image at the time t4, which is earlier than the estimated reaching time t2 by the sum of the capture time T21, the write time T22, the read time T23, and the process time T24. However, this is not a limitation. For example, the synchronizing circuit controller 67 may instruct the scanner 20 to start capturing the image at a time earlier than the time t4.

Figure 12:
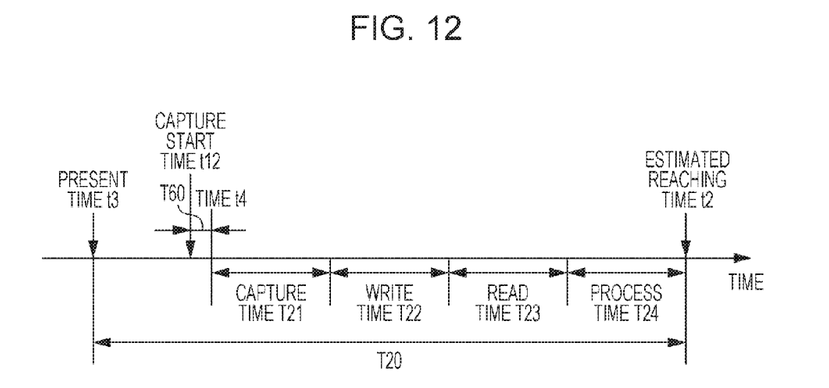
FIG. 12 illustrates an example of a capture start time according to a modification.

FIG. 12 illustrates an example of a capture start time according to the present modification. In the example illustrated in FIG. 12, the synchronizing circuit controller 67 instructs the scanner 20 to start capturing the image at a time t12, which is later than the present time t3 and earlier than the time t4 by a time T60. In this case, for example, even if the start of the capture time T21, the write time T22, the read time T23, or the process time T24 is delayed for some reasons, as long as the delay is shorter than or equal to the time T60, it is possible to start forming an image on the medium before the estimated reaching time t2.

2-4. Estimation of Reaching Time

The synchronizing circuit controller 67 may estimate the reaching time by using a method other than that of the exemplary embodiment. For example, the CPU 15 may control the transport unit 32 so that the transport time, which is a time required by the medium to reach the image forming position after started to be transported, is fixed. In this case, the synchronizing circuit controller 67 estimates that the reaching time is a time that is later than the transport start time by the transport time. It may not be necessary to estimate the reaching time. For example, in a case where an instruction on the aforementioned transport time is issued as described above, it is not necessary to estimate the reaching time.

2-5. Unit of Processing

In the exemplary embodiment, capturing of the images of regions, writing and reading of regional image data, and pre-transfer processing (data conversion and light exposure) are performed on each band. However, this is not a limitation. These operations may be performed on each region (in the exemplary embodiment, one line). In this case, it is sufficient that the SRAM 12 have a capacity for storing data for an image of one region.

2-6. Regions

In the exemplary embodiment, an image of one line is used as an image of a region. However, this is not a limitation. For example, an image of a half a line or a quarter of a line may be used as an image of a region; or an image of plural limes may be used as an image of a region. A region may have any shape and size, as long as the size of regional image data, which is data for an image of a region, is smaller the capacity of a storage unit (in the exemplary embodiment, the SRAM 12) having a capacity smaller than the size of image data for one page.

2-7. Storage Unit

In the exemplary embodiment, an SRAM is used as a storage unit for storing regional image data. However, this is not a limitation. A dynamic random access memory (DRAM), flash memory, or the like may be used. Any a storage unit may be used, as long as it is capable of storing regional image data representing an image captured as described above.

2-8. Parallel Processing

Figure 13:
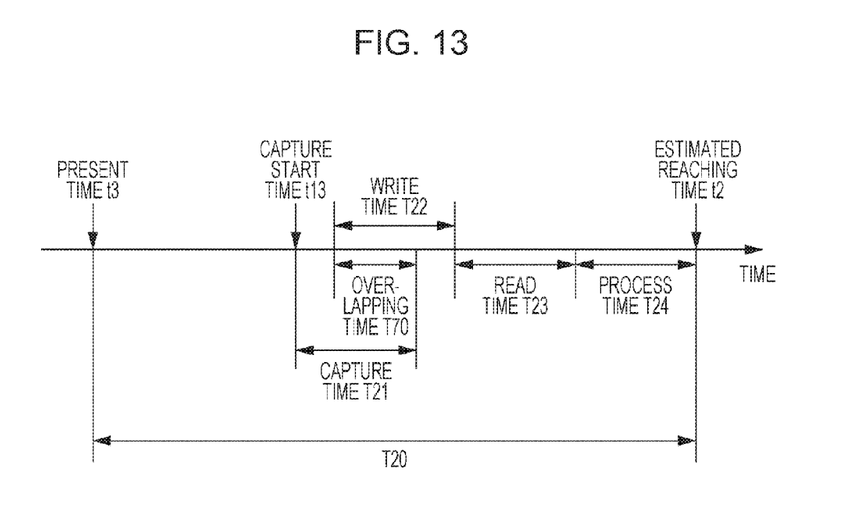
FIG. 13 illustrates an example of a capture start time according to a modification.

In the exemplary embodiment, capturing of an image, writing and reading of regional image data, and pre-transfer processing are sequentially performed. However, this is not a limitation. These operations may be performed concurrently. For example, when processing is performed on each band as in the exemplary embodiment, after the scanner 20 has captured an image of one line, writing the regional image data and capturing of an image of the next line may be performed concurrently. Referring to FIG. 13, a method of determining the capture start time in this case will be described.

FIG. 13 illustrates an example of a capture start time according to the present modification. In the example illustrated in FIG. 13, the capture time T21 and the write time T22 overlap in an overlapping time T70. The overlapping time T70, which is obtained by performing experiments or the like beforehand, is stored in the synchronizing circuit 16. In this case, the synchronizing circuit controller 67 instructs the scanner 20 to start capturing the image at a time t13 that is earlier than the estimated reaching time t2 by a time obtained by subtracting the overlapping time T70 from the sum of the capture time T21, the write time T22, the read time T23, and the process time T24. By taking the overlapping time into consideration, even if the capture operation, the write operation, the read operation, and the pre-transfer processing are concurrently performed, it is possible to copy an image by using the SRAM 12 in the same way as described in the exemplary embodiment.

2-9. Intervals Between Operations

In the exemplary embodiment, it is assumed that intervals between operations are negligibly short. However, this is not a limitation.

Figure 14:
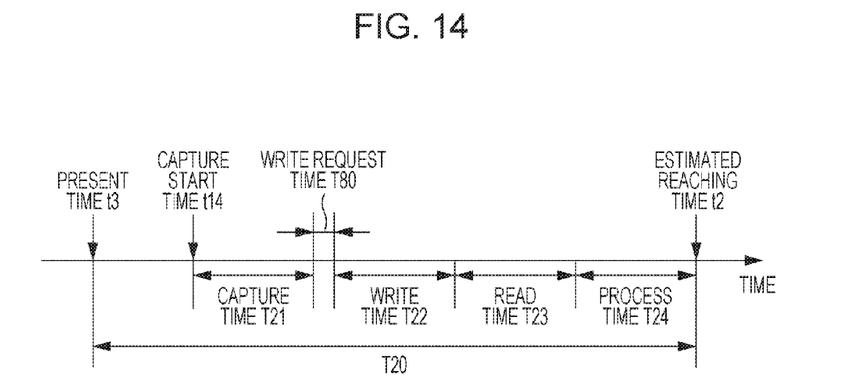
FIG. 14 illustrates an example of a capture start time according to a modification.

FIG. 14 illustrates an example of a capture start time according to the present modification. In the example illustrated in FIG. 14, there is a write request time T80, used to request writing of data in the SRAM 12, between the end of the capture operation and the start of the write operation. In this case, the synchronizing circuit controller 67 instructs the scanner 20 to start capturing the image at a time t14, which is earlier than the estimated reaching time t2 by the sum of the capture time T21, the write time T22, the read time T23, the process time T24, and the write request time T80.

A time required to perform each of operations that are performed from capturing an image on a document to forming an image on a medium may be obtained beforehand by performing experiments or the like. By doing so, whatever operation is performed, it is possible to copy an image by using the SRAM 12 in the same way as described in the exemplary embodiment.

2-10. Device to which Regional Image Data is Output

In the exemplary embodiment, regional image data read from the SRAM 12 is supplied to the image forming unit 31 through the video controller 14. However, this is not a limitation. For example, the CPU 15 may read regional image data from the SRAM 12 and may successively output the read regional image data to an external apparatus (such as a smartphone or a personal computer), which is connected to the copying apparatus through the external interface 13.

The external apparatus stores regional image data items that are sequentially output, and generates image data representing one page image by combining the stored regional image data items for the number of regions. Thus, by using a storage area (for example, the SRAM 12) that has a capacity smaller than the size of image data for one page, it is possible to capture an image of a document and to output the captured image to the external apparatus.

2-11. Provider of Regional Image Data

In the exemplary embodiment, regional image data is supplied from the scan circuit 111 and stored in the SRAM 12. However, this is not a limitation. For example, regional image data may be successively supplied from an external apparatus connected to the copying apparatus through the external interface 13, the CPU 15 may write the regional image data in the SRAM 12, and subsequent operations (the read operation and the pre-transfer processing) may be performed. In this case, the synchronizing circuit 16 determines a data supplying time on the basis of the reaching time, the write time, the read time, and the process time, which are estimated or calculated as in the exemplary embodiment; and the synchronizing circuit 16 instructs the external apparatus to supply the regional image data at the data supplying time.

To be specific, for example, the synchronizing circuit 16 instructs the external apparatus to start supplying regional image data at such a timing that the regional image data is written in the SRAM 12 at or before a time that is earlier than the estimated reaching time by the sum of the write time, the read time, and the process time. The synchronizing circuit 16 instructs the video controller 14 to start reading the regional image data in the same way as in the exemplary embodiment. Thus, it is possible to form an image supplied from the external apparatus by using a storage area (such as the SRAM 12) that has a capacity smaller than the size of image data for one page.

2-12. Category of Invention

The present invention may be implemented in any of a copying apparatus (image processing apparatus), a method for performing a copying operation, and a program for causing a computer to function as the components of the copying apparatus described above. This program is provided, for example, through an optical disc or another storage medium storing the program or through a communication line, such as the Internet, that allows the program to be downloaded and installed in a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A copying apparatus comprising:
   a capturing unit configured to divide an image on a document into a plurality of regions and to capture an image of each region;
   a storage unit configured to store data representing the image of the region;
   a forming unit configured to read the data and forms an image represented by the data on a medium; and
   a processor,
   wherein the processor is configured to execute an instruction unit configured to determine a capture start time using an amount of the data and to instruct the capturing unit to start capturing the image at the capture start time,
   wherein the instruction unit is configured to calculate, using the amount of the data, a capture time required by the capturing unit to capture the image of the region, a write time required to write the data to the storage unit, a read time required to read the data, and a process time required by the forming unit to process the data to start forming the image represented by the data on the medium, and
   wherein the instruction unit is configured to determine the capture start time by using the capture time, the write time, the read time, and the process time.

2. The copying apparatus according to claim 1,
   wherein the instruction unit is configured to determine a read start time using the amount of the data and to instruct the forming unit to start reading the data from the storage unit at the read start time.

3. The copying apparatus according to claim 1, further comprising:
   a transport unit configured to transport the medium,
   wherein the processor is further configured to execute an estimation unit configured to estimate a time at which the medium reaches an image forming position where the forming unit forms the image on the medium,
   wherein the instruction unit is configured to determine the capture start time to be at or before a time that is earlier than the estimated time by a sum of the capture time, the write time, the read time, and the process time.

4. The copying apparatus according to claim 3,
   wherein the instruction unit is configured to determine a processing start time to be at or before a time that is earlier than the estimated time by the process time and to instruct the forming unit to start processing the data at the processing start time.

5. The copying apparatus according to claim 1,
   wherein the instruction unit is configured to determine a next capture start time at or before a time that is later than the capture start time by a time required by the forming unit to form the image of the region on the medium after the forming unit has processed the data, and the instruction unit is configured to instruct the capturing unit to start capturing an image of a next one of the regions at the next capture start time.

6. The copying apparatus according to claim 3,
   wherein the instruction unit is configured to determine a next capture start time at or before a time that is later than the capture start time by a time required by the forming unit to form the image of the region on the medium after the forming unit has processed the data, and the instruction unit is configured to instruct the capturing unit to start capturing an image of a next one of the regions at the next capture start time.

7. The copying apparatus according to claim 4,
   wherein the instruction unit is configured to determine a next capture start time at or before a time that is later than the capture start time by a time required by the forming unit to form the image of the region on the medium after the forming unit has processed the data, and the instruction unit is configured to instruct the capturing unit to start capturing an image of a next one of the regions at the next capture start time.

8. The copying apparatus according to claim 1, further comprising:
   a transport unit configured to transport a medium,
   wherein the instruction unit is configured to determine a time at which the transport unit starts transporting the medium using the capture time, the write time, the read time, the process time, and a transport time required by the medium to reach an image forming position where the forming unit forms the image on the medium.

9. The copying apparatus according to claim 1, wherein the processor is configured to determine the amount of data according to a size of paper on which the image is formed and according to a capturing resolution of the capturing unit.

* * * * *